(12) United States Patent
Becker et al.

(10) Patent No.: US 8,140,221 B2
(45) Date of Patent: Mar. 20, 2012

(54) MOTOR VEHICLE HAVING A VEHICLE BODY AND A CHASSIS

(75) Inventors: Michael Becker, Leonberg/Warmbronn (DE); Matthias Dietz, Bietigheim-Bissingen (DE); Achim Schulz, Niefern-Öschelbronn (DE); Thorsten Koch, Schwieberdingen (DE); Thomas Hunn, Renningen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 1074 days.

(21) Appl. No.: 12/029,135

(22) Filed: Feb. 11, 2008

(65) Prior Publication Data

US 2008/0195278 A1 Aug. 14, 2008

(30) Foreign Application Priority Data

Feb. 9, 2007 (DE) .................. 10 2007 006 589

(51) Int. Cl.
B60G 17/016 (2006.01)

(52) U.S. Cl. ...... 701/38; 701/37; 280/5.506; 280/5.507; 280/86.5; 280/124.1; 280/124.106

(58) Field of Classification Search .................. 701/69, 701/37–38; 280/5.514, 124, 124.1, 86.5, 280/124.106, 5.506, 5.507; 267/220
See application file for complete search history.

(56) References Cited

U.S. PATENT DOCUMENTS

| | | | | |
|---|---|---|---|---|
| 3,625,539 A | * | 12/1971 | Crouch et al. | 280/102 |
| 4,930,082 A | * | 5/1990 | Harara et al. | 701/38 |
| 5,004,257 A | * | 4/1991 | MacIsaac | 280/5.507 |
| 5,310,200 A | * | 5/1994 | MacIsaac | 280/5.506 |
| 5,368,337 A | * | 11/1994 | Torres | 285/114 |
| 6,253,643 B1 | * | 7/2001 | Buck | 81/57.33 |
| 6,374,953 B1 | * | 4/2002 | Casas | 187/399 |
| 6,523,843 B2 | * | 2/2003 | Wiesemann et al. | 280/124.107 |
| 6,883,813 B2 | * | 4/2005 | Gottschalk | 280/86.5 |
| 2004/0090019 A1 | | 5/2004 | Germain | |
| 2004/0164511 A1 | * | 8/2004 | Gottschalk | 280/86.5 |

FOREIGN PATENT DOCUMENTS

| | | |
|---|---|---|
| DE | 1 811 613 | 7/1970 |
| DE | 41 25 285 A1 | 2/1993 |
| DE | 197 02 241 A1 | 2/1998 |
| DE | 19702241 A1 | 2/1998 |

(Continued)

OTHER PUBLICATIONS

Electromechanical steering, suspension, drive and brake modules; Zetterstrom, S.; Vehicular Technology Conference, 2002. Proceedings. VTC 2002-Fall. 2002 IEEE 56th; vol. 3; Digital Object Identifier: 10.1109/VETECF.2002.1040538 Publication Year: 2002 , pp. 1856-1863 vol. 3.*

(Continued)

Primary Examiner — Cuong H Nguyen

(57) ABSTRACT

A motor vehicle has a vehicle body and a chassis that has at least one wheel suspension device for two opposing wheel. An adjusting device is assigned to each of the wheels. The adjusting devices are coupled to one another by a stabilizer. At least two stabilizer bearings are provided for rotatable support of the stabilizer, and at least one coupling device is provided on the vehicle body for variable torque support of the stabilizer. Accordingly, a reliable level lifting function is provided, based on a sturdy configuration that is both space-saving and weight-saving. The coupling device for torque support of the stabilizer on the vehicle body may have a switchable blocking device and/or at least one spring mechanism.

20 Claims, 9 Drawing Sheets

FOREIGN PATENT DOCUMENTS

| | | | |
|---|---|---|---|
| DE | 10227416 A1 | * | 1/2004 |
| DE | 10 2004 030 466 A1 | | 3/2006 |
| DE | 10 2005 001 827 A1 | | 7/2006 |
| EP | 1 609 634 A1 | | 12/2005 |
| EP | 1609634 A1 | | 12/2005 |
| EP | 1 679 209 A1 | | 7/2006 |
| EP | 1679209 A1 | | 7/2006 |
| JP | 07266827 A | * | 10/1995 |
| JP | 2005-125834 A | | 5/2005 |
| WO | WO 03000584 A1 | * | 12/2003 |
| WO | WO 2009115873 A1 | * | 9/2009 |

OTHER PUBLICATIONS

Research of semi-active suspension self-adjust sky/ground-hook hybrid control simulation; Chen Jie-ping; Guo Wanshan; Feng Wutang; Chen Haoyun; Dong Fulong; Electric Information and Control Engineering (ICEICE), 2011 International Conference on Digital Object Identifier: 10.1109/ICEICE.2011.5776807; Publication Year: 2011 , pp. 5230-5234.*

Analysis of Vehicle Handling and Stability in Frequency Domain Based on System Identification Method; Wu Changshui; Yuan Ming; Gong Yuanming; Qian Yu Bin; Information Engineering (ICIE), 2010 WASE International Conference on; vol. 3 Digital Object Identifier: 10.1109/ICIE.2010.264; Publication Year: 2010 , pp. 365-368.*

Integrated chassis control using ANFIS; Yuming Hou; Jie Zhang; Yunqing Zhang; Liping Chen; Automation and Logistics, 2008. ICAL 2008. IEEE International Conference on; Digital Object Identifier: 10.1109/ICAL.2008.4636414; Publication Year: 2008 , pp. 1625-1630.*

Research on Co-simulation and Test of Semi-active Suspension; Zhu Renxue; Niu Limin; Computer Modeling and Simulation, 2010. ICCMS '10. Second International Conference on; vol. 2; Digital Object Identifier: 10.1109/ICCMS.2010.154 Publication Year: 2010 , pp. 353-357.*

Vehicle suspension model and dynamic simulation on handling stability; Xiaobin Ning; Jishen Sheng; Bin Meng; Jie Zhang; Mechanic Automation and Control Engineering (MACE), 2010 International Conference on; Digital Object Identifier: 10.1109/MACE.2010.5536012; Publication Year: 2010 , pp. 640-644.*

European Search Report dated Mar. 16, 2010.

* cited by examiner

MOTOR VEHICLE HAVING A VEHICLE BODY AND A CHASSIS

CROSS-REFERENCE TO RELATED APPLICATION

This application claims the priority, under 35 U.S.C. §119, of German application DE 10 2007 006 589.4, filed Feb. 9, 2007; the prior application is herewith incorporated by reference in its entirety.

BACKGROUND OF THE INVENTION

Field of the Invention

The invention relates to a motor vehicle having a vehicle body and a chassis, which has at least one wheel suspension mechanism for two opposing wheels. An adjusting device is assigned to each of the wheels. The adjusting devices assigned to the opposing wheels are coupled by a stabilizer. At least two stabilizer bearings are provided for rotatable support of the stabilizer.

U.S. patent publication No. 2004/0090019 A1 describes a configuration having two shock absorbers for opposing wheels on a motor vehicle, such that a hydraulic adjusting device is positioned on each of the shock absorbers, and the hydraulic adjusting devices are coupled by a rotatably mounted torsion stabilizer.

Published, European patent application EP 1 609 634 A1 describes a chassis for a motor vehicle having at least one wheel suspension mechanism for two opposing wheels, such that the or each wheel suspension device has a stabilizer or at least one element having rotary spring properties. The stabilizer or each element is disposed between opposing wheels and secured on a body of the vehicle. An adjusting device acts on the stabilizer or on the single element or each element and has rotary spring properties for each wheel to ensure a change in level of the vehicle.

BRIEF SUMMARY OF THE INVENTION

It is accordingly an object of the invention to provide a motor vehicle having a vehicle body and a chassis that overcomes the above-mentioned disadvantages of the prior art devices of this general type, which has a properly functioning level adjustment for a motor vehicle of the type defined in the introduction, so as to achieve reliable operation and a sturdy configuration that is both space-saving and weight-saving.

With the foregoing and other objects in view there is provided, in accordance with the invention, a motor vehicle. The motor vehicle contains a vehicle body, wheels including two opposing wheels, and a chassis supporting the vehicle body and having at least one wheel suspension device for the two opposing wheels. The wheel suspension device includes a stabilizer and adjusting devices. One of the adjusting devices is associated with each of the opposing wheels, and the adjusting devices are coupled by the stabilizer. At least two stabilizer bearings are provided for rotatable support of the stabilizer, and at least one coupling device is provided for variable torque support of the stabilizer on the vehicle body.

According to the present invention, a motor vehicle of the type defined in the introduction has a coupling device for variable torque support of the stabilizer on the vehicle structure. Due to the variable torque support of the stabilizer, this allows the stabilizer to be mounted to freely rotate at least for the most part with respect to the chassis in a first operating mode, i.e., in normal driving. In another operating mode, in particular when a height adjustment of the vehicle body with respect to the ground and/or with respect to the wheels is desired, the stabilizer can be clamped with respect to the vehicle body.

The vehicle may advantageously be configured so that the level of the vehicle body with respect to the wheels can be raised by operation of the adjusting devices in the same direction and by blocking the stabilizer, i.e., by clamping the stabilizer with respect to the vehicle body. In certain situations, it may be highly advantageous to raise the vehicle body with respect to the wheels. Such situations may include, for example, driving into a parking building, in conjunction with driving over a ramp, or driving over ground thresholds. The vehicle body is raised in the area of the two opposing wheels in particular.

Hydraulic adjusting devices may advantageously be provided.

Electromechanical adjusting devices may advantageously be provided.

The adjusting devices may be configured advantageously for roll stabilization. Roll stabilization with the help of the adjusting devices may be accomplished while the vehicle is moving in normal driving mode, if necessary. In certain situations, e.g., the situations referenced above, the vehicle body may be raised with the help of these adjusting devices.

The coupling device for variable torque support of the stabilizer may be disposed in the front area, i.e., in the area of the front axle of the motor vehicle.

The coupling device may advantageously be disposed in the area between the two stabilizer bearings.

In an advantageous further embodiment of the present invention, the coupling device may be disposed at the center of the stabilizer. This may be expedient in particular when exactly one coupling device is provided for the stabilizer.

The coupling device may advantageously have a switchable blocking device for torque support of the stabilizer. Due to such a blocking device, preferably configured actively, it is possible to switch between a first operating case, in which the stabilizer is freely rotatable in the stabilizer bearings with respect to the vehicle body, and a second operating case in which the stabilizer is blocked, i.e., clamped with respect to the vehicle body by the coupling device.

The stabilizer may advantageously be blockable by a form closure. It may therefore be advantageous if the stabilizer has form-fitting elements in the area of the coupling device.

In an advantageous further embodiment of the present invention, the stabilizer may be blockable by friction closure as an alternative or in addition to the form closure.

The coupling device may advantageously have rotatably mounted clamping pieces.

The clamping pieces may advantageously be provided at least partially with a rubber coating for blocking the stabilizer.

The clamping pieces may advantageously be rotatable with the help of at least one worm drive.

The stabilizer may advantageously have a widened diameter in the area of the clamping pieces.

In an advantageous further embodiment of the present invention, at least one electric motor may be provided for blocking and/or releasing the stabilizer.

The coupling device may advantageously have a lever connected to the stabilizer, which may in turn be connected to the vehicle body by at least one actuator, e.g., a hydraulic cylinder.

A control device for controlling the adjusting devices and for controlling the coupling device may advantageously be provided.

In an advantageous further embodiment of the present invention, the coupling device may have at least one spring mechanism for variable torque support of the stabilizer. Such a passive coupling device is characterized by a simple configuration, but triggering of the coupling device may be omitted. The spring mechanism is preferably configured as a spring with a soft characteristic. The spring mechanism may advantageously be configured as a torsion bar disposed generally parallel to the stabilizer.

The torsion bar may essentially be connected at the center to the stabilizer in a rotationally fixed manner.

The torsion bar may advantageously be coupled at its ends to entraining elements that are fixed on the body.

The spring mechanism may advantageously be configured as a plate spring.

The plate spring may advantageously be disposed centrally on the stabilizer.

Other features which are considered as characteristic for the invention are set forth in the appended claims.

Although the invention is illustrated and described herein as embodied in a motor vehicle having a vehicle body and a chassis, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
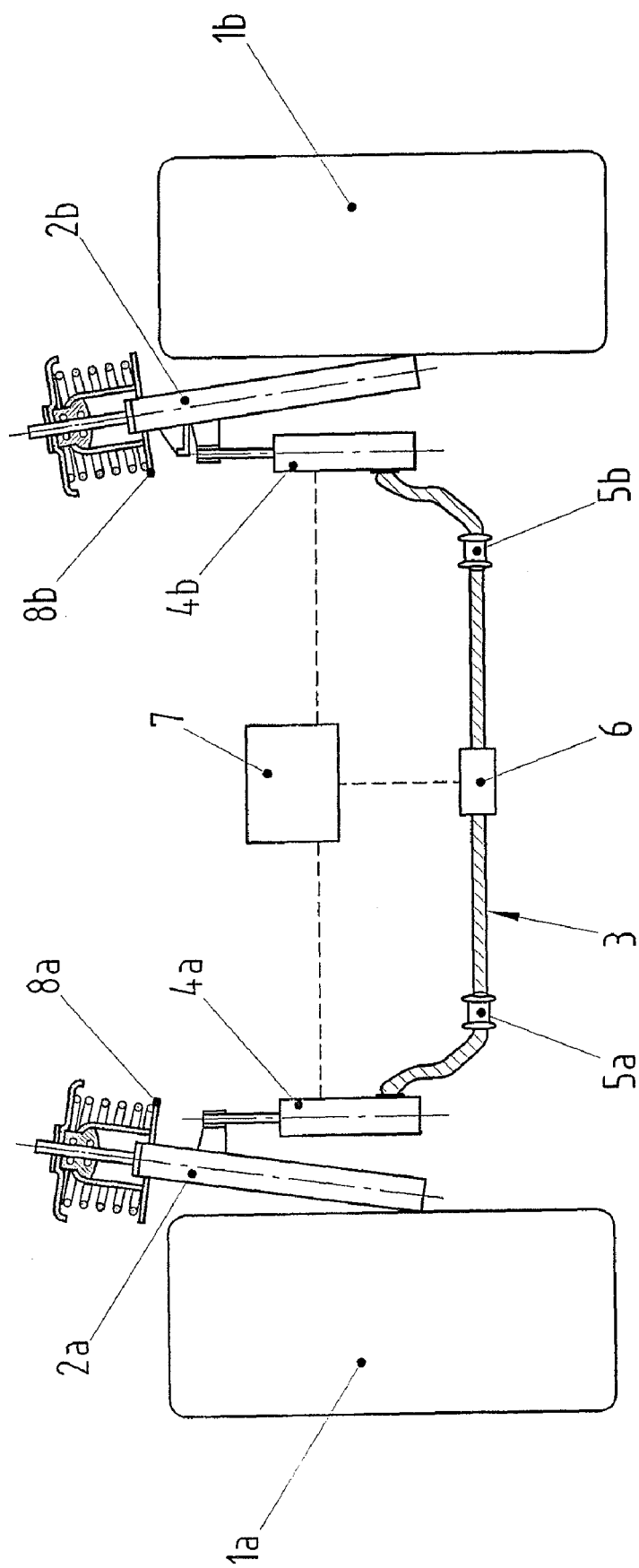
FIG. 1 is a diagrammatic illustration of a stabilizer disposed between two opposing wheels.

Referring now to the figures of the drawing in detail and first, particularly, to FIG. 1 thereof, there is shown two opposing wheels $1a$, $1b$ of a motor vehicle. One strut $2a$, $2b$ is provided for each wheel $1a$, $1b$. The struts $2a$, $2b$ may be configured as McPherson struts, for example. An adjusting device $4a$, $4b$ is assigned to each wheel $1a$, $1b$. In the example shown here, the adjusting devices $4a$, $4b$, which are indicated only schematically, are configured as hydraulic adjusting devices $4a$, $4b$. The adjusting devices $4a$, $4b$ are preferably connected to the corresponding struts $2a$, $2b$. Unlike the drawing in the figure, an adjusting device $4a$, $4b$ may be connected, preferably by welding, to a strap on a spring plate $8a$, $8b$ of the strut $2a$, $2b$. The adjusting devices $4a$, $4b$ assigned to the opposing wheels $1a$, $1b$ are coupled by a stabilizer 3. The connection between the stabilizer 3 and the adjusting devices $4a$, $4b$ may be accomplished, for example, with the help of at least one ball joint (not shown in the drawing), preferably integrated. For connecting the adjusting devices $4a$, $4b$ to the struts $2a$, $2b$, at least one ball joint, preferably integrated, may be provided. The stabilizer 3 in the example shown here is configured to be undivided and may be rotatably mounted by using at least two stabilizer bearings $5a$, $5b$. The stabilizer bearings $5a$, $5b$ preferably have a low torsional stiffness and allow a rotation greater than approximately 40°, for example. For variable torque support of the stabilizer 3, a coupling device 6 is provided, disposed in the area of the center of the stabilizer 3 in the example shown here. A control device 7 is provided for controlling the adjusting devices $4a$, $4b$ in the example shown here. For the height adjustment of a vehicle body by the adjusting devices $4a$, $4b$, there is torque support of the stabilizer 3 with respect to the vehicle body, i.e., blocking and/or clamping of the stabilizer 3 with the help of the coupling device 6. For the height adjustment, the adjusting devices $4a$, $4b$ may be actuated in synchronization. There is a height adjustment of the vehicle body with respect to the ground, i.e., with respect to the road surface and/or with respect to the wheels $1a$, $1b$. To facilitate understanding, no additional details of the chassis such as connecting rods or the vehicle body are shown in the drawing.

If the adjusting devices $4a$, $4b$ are actuated in synchronization with the stabilizer 3 that is blocked with respect to the vehicle body, then a reactive torque supported on the wheel mounts may be transferred by the stabilizer 3, thereby lifting the vehicle, i.e., the vehicle body. Blocking of the stabilizer 3 with respect to the vehicle body is problematical during normal driving operation because when the stabilizer 3 is blocked, the stiffness of the stabilizer 3 and the body spring suspension act in parallel and driving comfort is severely impaired by a spring suspension with a hard characteristic accordingly.

To allow variable torque support, the blocking of the stabilizer with respect to the vehicle body may be configured to be switchable. To allow a variable torque support, blocking may be performed with the help of a spring mechanism as an alternative or in addition. With the coupling device 6, which has a spring mechanism and is not configured to be switchable, a connection of the coupling device 6 to the control device may be omitted. In normal driving operation, there is little or no torque support for the stabilizer with respect to the vehicle body in the area of the coupling device 6. During normal driving operation, the adjusting devices $4a$, $4b$ may also be used for roll stabilization. The adjusting devices $4a$, $4b$ may be controllable by the control device 7 accordingly. The adjusting devices $4a$, $4b$ for roll stabilization are preferably configured as hydraulic adjusting devices $4a$, $4b$. However, in conjunction with the exemplary embodiments of the present invention described here, it is also possible to use differently configured adjusting devices $4a$, $4b$. The adjusting devices $4a$, $4b$ may be configured to be hydraulic, electrohydraulic, electromechanical, magnetic or electromagnetic, for example.

Figure 2:
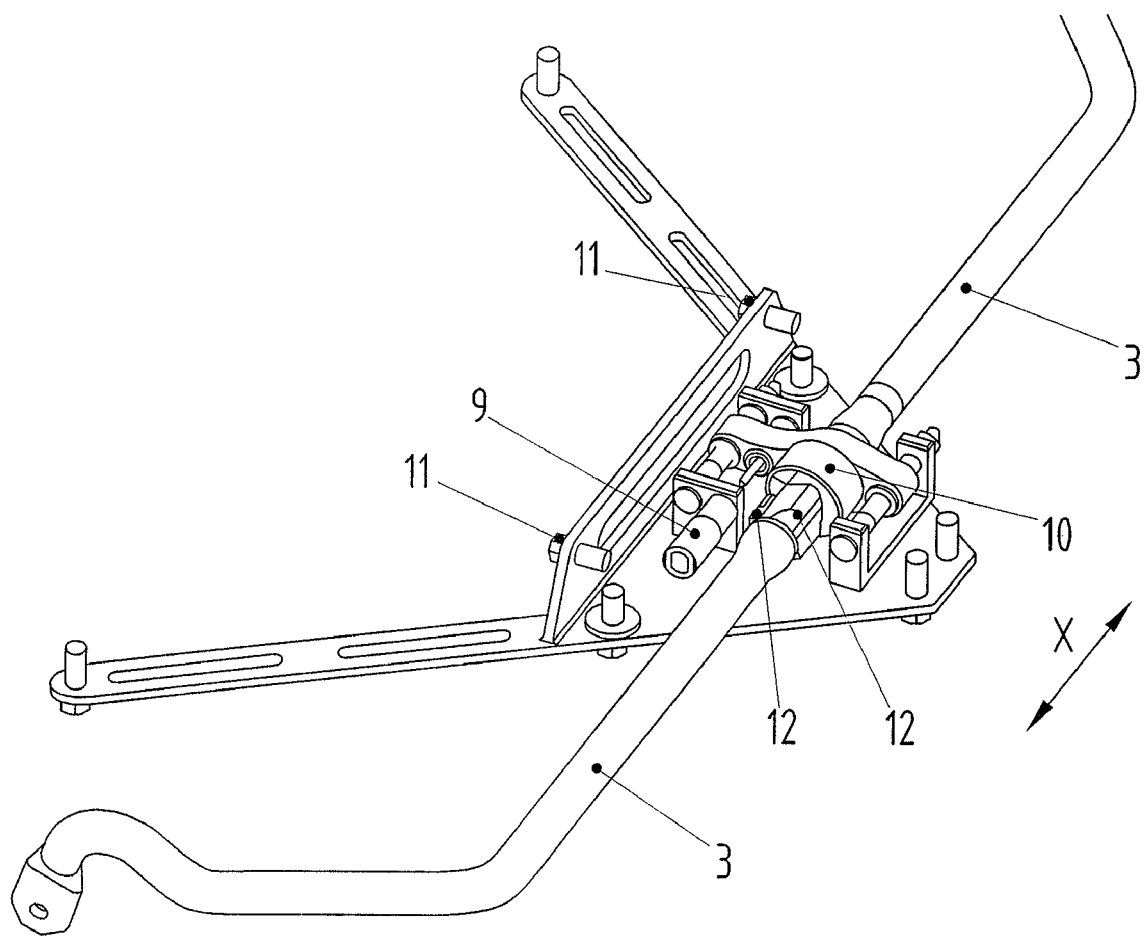
FIG. 2 is a diagrammatic, perspective view of a coupling device having a switchable blocking device.

FIG. 2 shows an example of the coupling device 6 (see FIG. 1), in which the coupling device 6 has a blocking device 10 for the stabilizer 3. The blocking device 10 is configured to be switchable, so that the blocking device 10 may preferably be shifted in the direction x along the axis of the stabilizer 3 with the assistance of an electric motor 9. By shifting the blocking device 10 in the direction x, a form closure can be established and/or released again. If the blocking device 10 is shifted by form-fitting elements 12 provided on the stabilizer 3, the stabilizer 3 is blocked by the form-fitting engagement and there is thus torque support for the stabilizer 3 on the vehicle body. The coupling device 6 is connected to the vehicle body with the help of fastening elements 11. This connection is preferably provided in the area of the front axle of the vehicle, e.g., on a cross beam. An electric motor 9 is configured as an A.C. motor in connection with a linear drive, for example.

Figure 3:
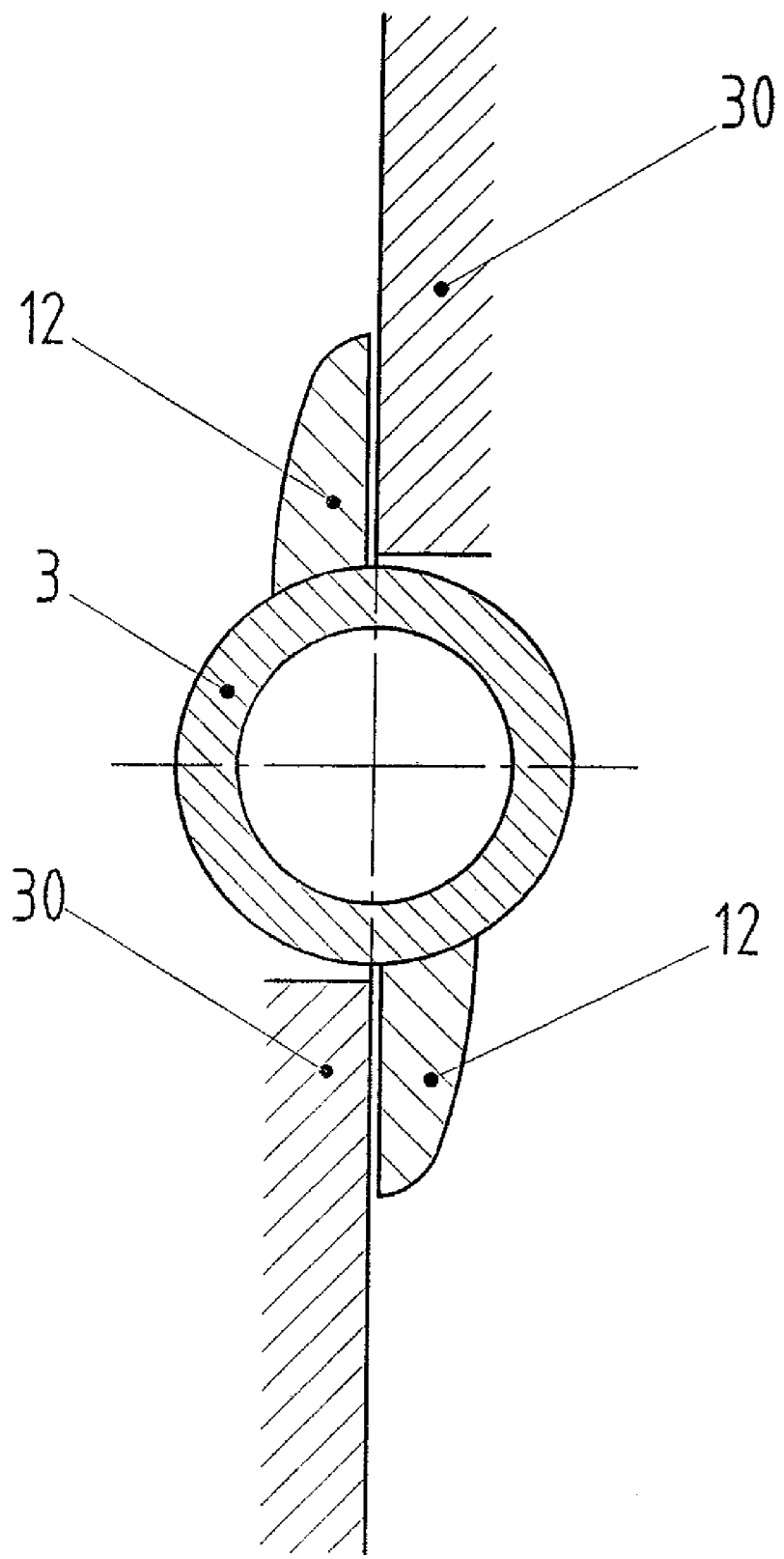
FIG. 3 is a diagrammatic, sectional view through the stabilizer having form-fitting elements.

FIG. 3 shows a section through the stabilizer 3, where the stabilizer 3 has one or more form-fitting elements 12, namely two in the present example, which cooperate with a blocking device 30 in corresponding positioning of the latter in such a way that the stabilizer 3 is blocked to prevent it from twisting. The blocking device 30 may be shifted along the axis of the stabilizer 3, e.g., for positioning.

Figure 4:
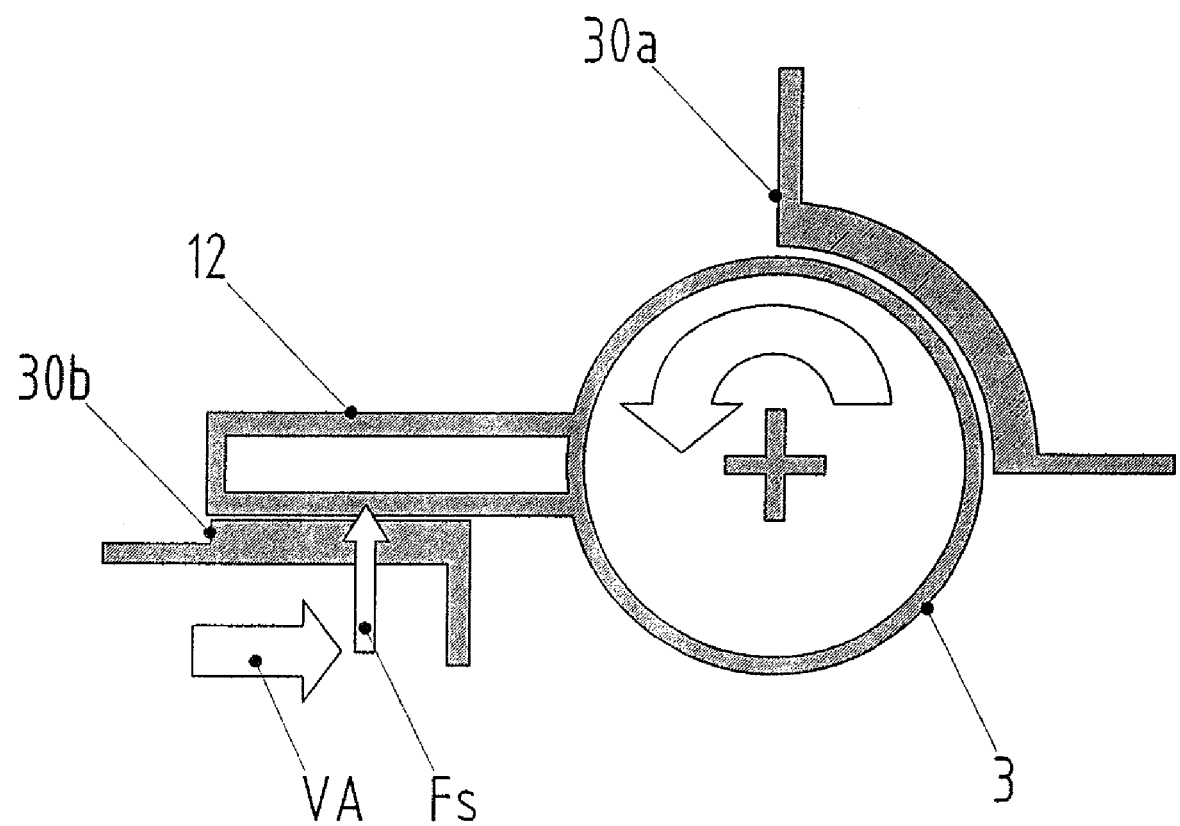
FIG. 4 is an illustration showing a configuration for blocking the stabilizer by a friction closure.

FIG. 4 shows a schematic sectional diagram of the stabilizer 3 with a form-fitting element 12. Blocking elements 30a, 30b configured as stops are provided for blocking the stabilizer 3. In the example shown here, a stationary blocking element 30a is provided with two stops. In addition, a switchable blocking element 30b is provided. In the example shown here, the switchable blocking element 30b is configured to be displaceable along a displacement direction VA, thus providing a switchable stop for the stabilizer 3. If blocking is activated, a supporting force $F_S$ acts on the form-fitting element 12 connected to the stabilizer 3.

Figure 5:
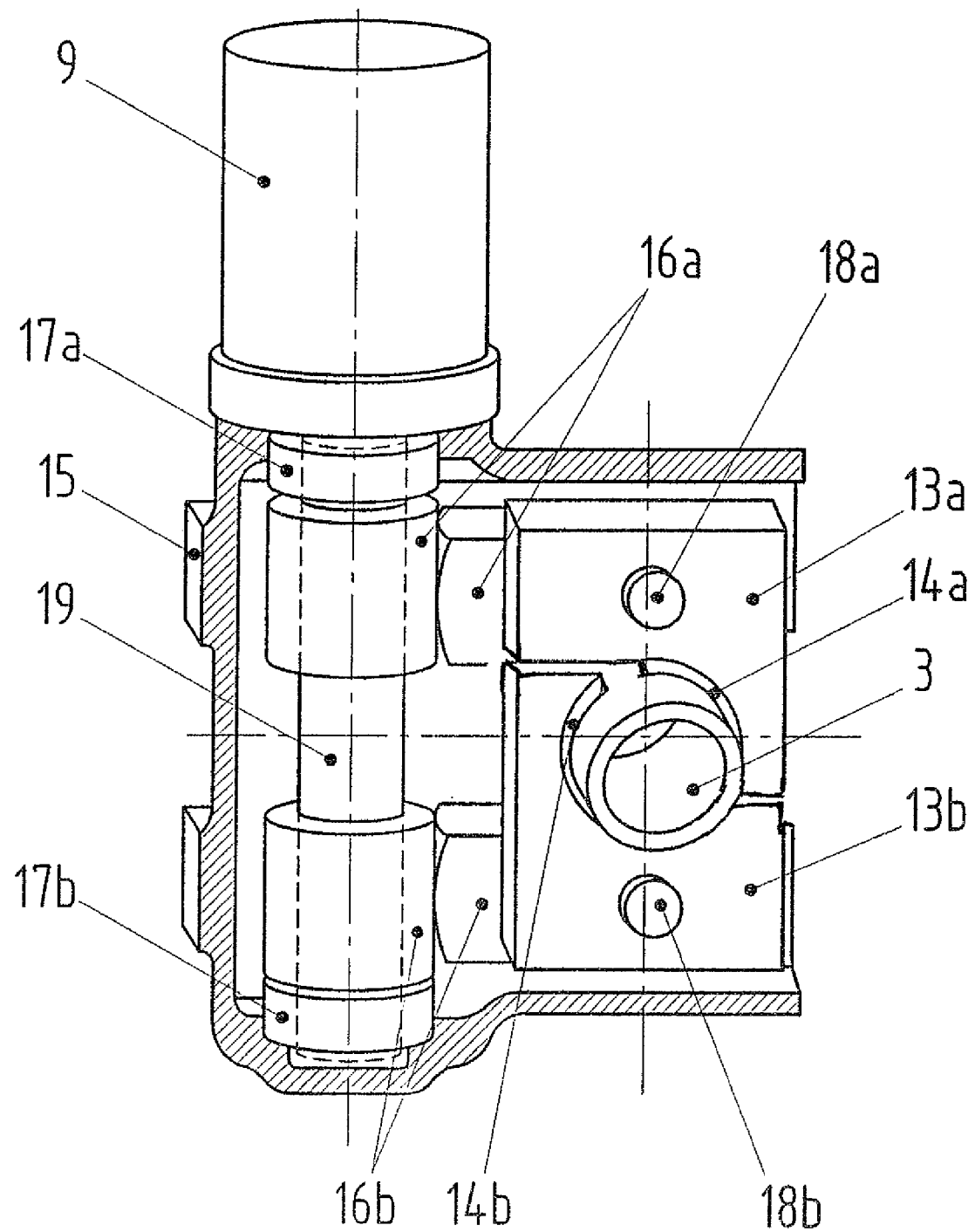
FIG. 5 is a diagrammatic, perspective view of a coupling device with clamping pieces.
Figure 6:
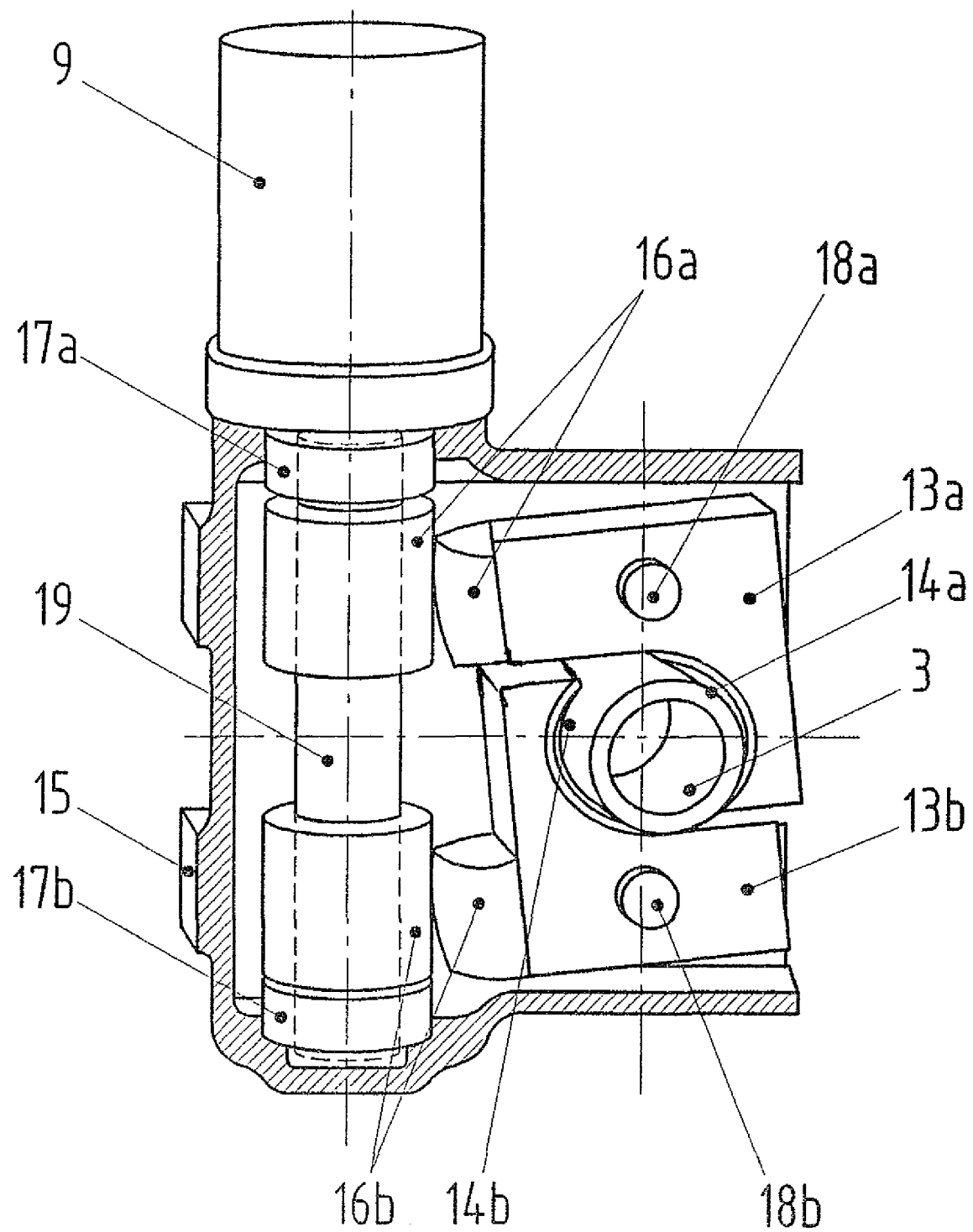
FIG. 6 is a diagrammatic, perspective view of the coupling device with the clamping pieces.

FIGS. 5 and 6 show the coupling device 6 (see FIG. 1) having two rotatably mounted clamping pieces 13a, 13b with the help of which the stabilizer 3 can be blocked by friction closure. The clamping pieces 13a, 13b are each rotatably mounted with the help of bearing bolts 18a, 18b. The clamping pieces 13a, 13b each have a rubber coating 14a, 14b facing the stabilizer 3. The clamping pieces 13a, 13b may generally be made of a metal or a metal alloy, e.g., steel or aluminum. In FIG. 5, the clamping pieces 13a, 13b are shown without rotation, so there is no friction closure with the stabilizer 3, i.e., there is no torque support of the stabilizer 3 with respect to the vehicle body. By rotating the clamping pieces 13a, 13b, the stabilizer 3 can be blocked in a frictionally engaged manner. The rotation of the clamping pieces 13a, 13b is accomplished with the assistance of worm drives 16a, 16b, each containing a worm gear and a toothed segment, such that a common shaft 19 is provided for actuation of the worm drives 16a, 16b. Bearing devices 17a, 17b are provided for the shaft 19. The shaft 19 may be driven by the electric motor 9, e.g., an A.C. electric motor. A housing 15 may be provided at least for the shaft 19 and the worm drives 16a, 16b.

Figure 7:
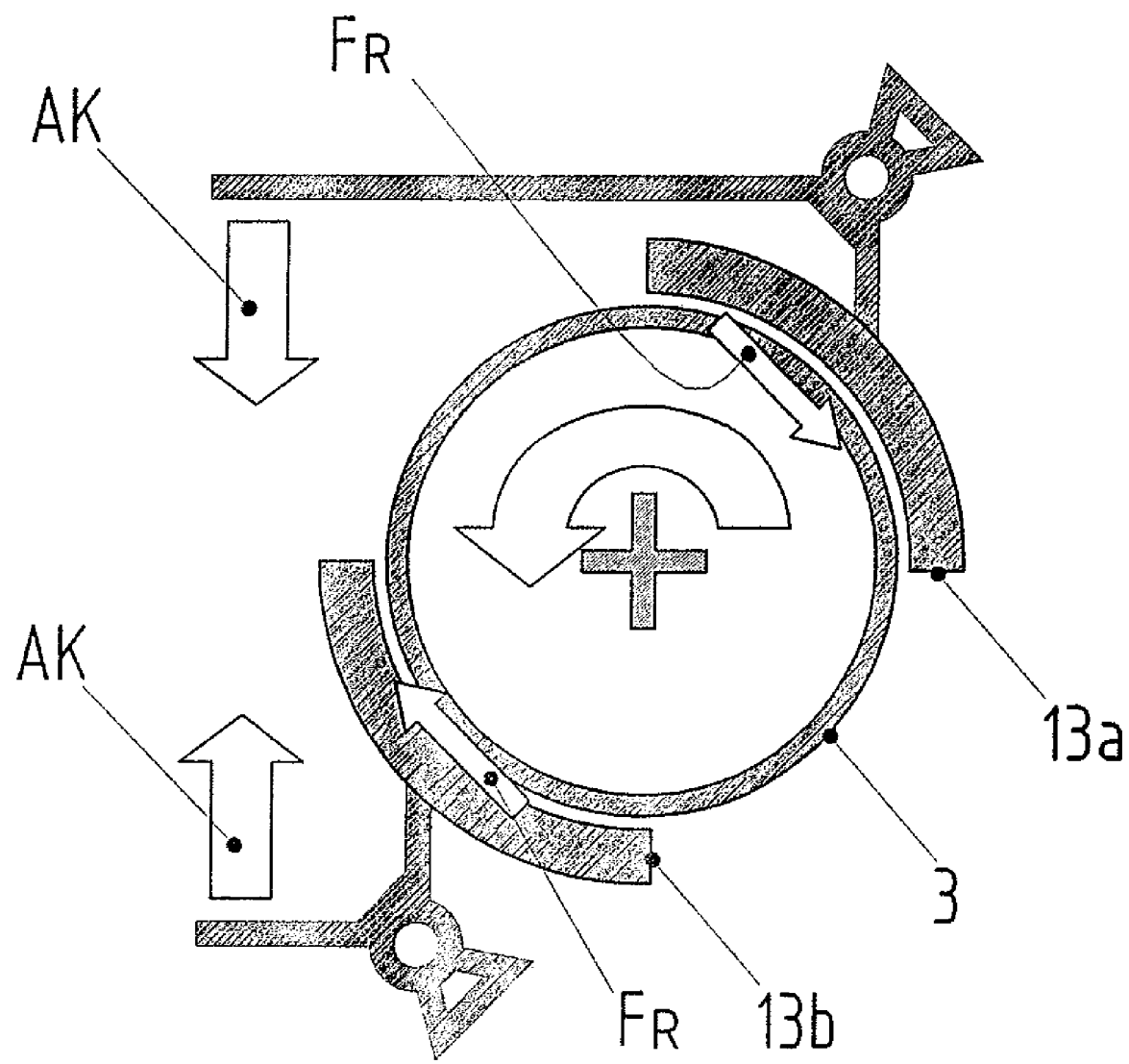
FIG. 7 is an illustration showing a configuration for blocking the stabilizer by a form closure.

FIG. 7 shows schematically and in a sectional diagram an example of the stabilizer 3 and a blocking device based on the principle of friction closure. The blocking device is activated by applying an active clamping force AK with the assistance of an electric motor, so that the clamping pieces 13a, 13b are pressed against the stabilizer 3. A torque on the stabilizer 3 then produces a frictional force $F_R$ between the stabilizer 3 and the clamping pieces 13a, 13b by which the stabilizer 3 is blocked. In particular when using a coupling device 6 (see FIG. 1) with which the stabilizer 3 can be blocked by friction closure, it may be advantageous for the diameter of the stabilizer 3 to be widened in the area in which the friction closure is achieved, e.g., in the area of the clamping pieces 13a, 13b (see FIGS. 5, 6 and 7).

Figure 8:
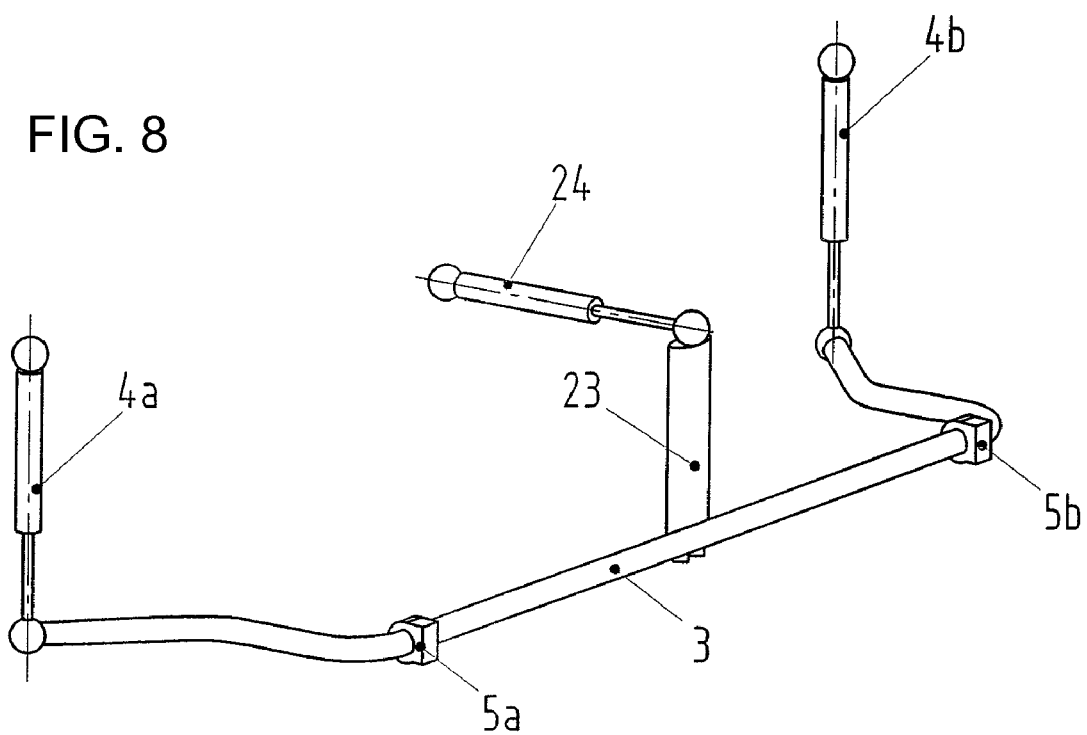
FIG. 8 is a diagrammatic, perspective view of the coupling device having a lever connected to the stabilizer and an actuator connected to the lever.

As shown in FIG. 8 as an example, the switchable blocking device may also be configured so that a lever 23 connected to the stabilizer 3, preferably in the area of the center of the stabilizer 3, is provided, the lever 23 being connected to the vehicle body at least by an actuator 24. The actuator 24 is disconnected during normal driving operation. To raise the vehicle, the actuator 24 is blocked and the adjusting devices 4a, 4b are operated in synchronization.

Figure 9:
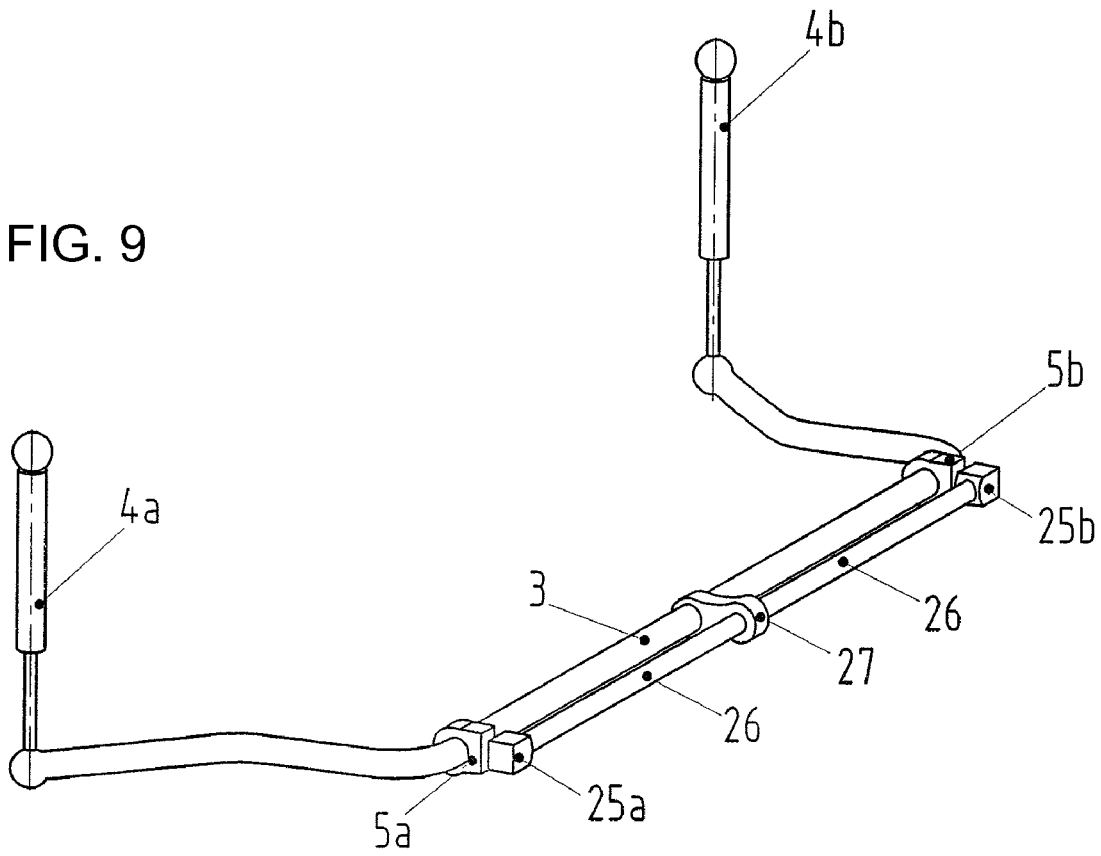
FIG. 9 is a diagrammatic, perspective view of the stabilizer having a torsion bar disposed in parallel.
Figure 10:
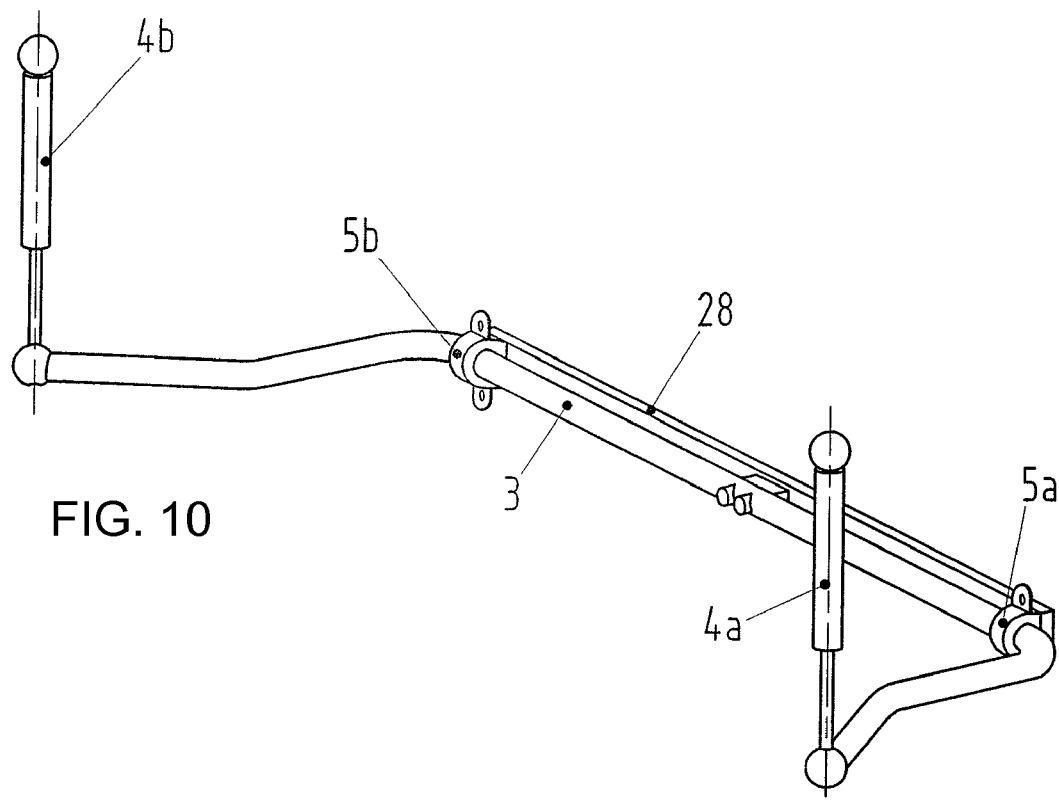
FIG. 10 is a diagrammatic, perspective view of the stabilizer having the torsion bar disposed in parallel and configured as a plate section.
Figure 11:
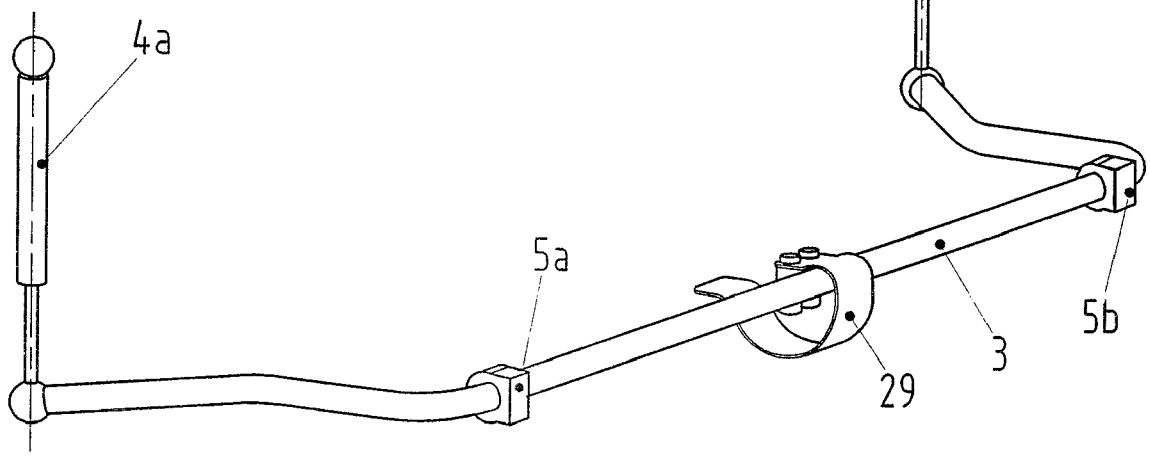
FIG. 11 is a diagrammatic, perspective view of the stabilizer having a plate spring acting centrally.

FIGS. 9, 10 and 11 show coupling devices 6 having at least one spring mechanism for torque support of the stabilizer 3 on the vehicle body. In normal driving operation, the spring mechanism, preferably configured to have a soft characteristic, is at least largely without any interfering effect because the center of the stabilizer 3 does not rotate in relation to the vehicle body. Even in roll stabilization, the center of the stabilizer 3 does not rotate in relation to the vehicle body. Undisturbed roll stabilization may thus be accomplished by the adjusting devices 4a, 4b, operated in opposite directions, if necessary. With regard to the spring suspension, in normal driving operation the stiffness of the stabilizer 3 is active as a frame spring in series with the spring mechanism of the coupling device 3, which acts in parallel with the chassis spring. The stiffness of the actual body spring must thus be selected to be softer in order to achieve on the whole the vertical spring rate desired for the vehicle body.

As FIG. 9 shows, the spring mechanism may be configured as a torsion bar 26 disposed generally parallel to the stabilizer 3, with the torsion bar being connected to the stabilizer 3 via a rotationally fixed connection 27. Entraining elements mounted permanently on the body are provided on the two ends of the spring mechanism facing the wheels 1a, 1b, the spring mechanism being configured as the torsion bars 26 in the present example (see FIG. 1).

As shown in FIG. 10, the spring mechanism 26 may also be configured as a sheet metal section 28, which may be configured to be integrated with the receptacle of the stabilizer bearing 5a, 5b at each of its ends.

As shown in FIG. 11, the spring mechanism may be configured as a plate spring 29, which preferably acts centrally on the stabilizer 3. Other embodiments of the spring mechanism not shown here, e.g., torsion springs are also possible.

The inventive coupling device 6 for variable torque support of the stabilizer may preferably be disposed in the front area of the motor vehicle, i.e., in the area of the front axle. One or more such coupling devices 6 may also be disposed in another area, e.g., in the area of the rear axle, as an alternative or in addition.

According to this invention, a reliable level lifting function that is both space-saving and weight-saving and may be used on the front axle for protection of the spoiler, for example, may also be used. Activation of the level lifting function may be accomplished manually, for example, with the engine running, e.g., with the help of a switch that may be installed in the interior of the vehicle, e.g., in the center console. Then automatic deactivation of the level lifting function when a certain maximum speed is exceeded may also be provided.

According to one of the essential ideas on which the present invention is based, the coupling device 6 may have a switchable blocking device and/or at least one spring mechanism for torque support of the stabilizer 3 on the vehicle body.

The invention claimed is:

1. A chassis for a motor vehicle having a vehicle body, the chassis comprising:
   struts;
   two opposing wheels with one of said struts assigned to each of said wheels;
   rotatably mounted stabilizer;
   adjusting devices for roll stabilization assigned to at least one of said wheels or said struts, said adjusting devices coupled with one another via said rotatably mounted stabilizer disposed between said adjusting devices; and
   a coupling device acting on said rotatably mounted stabilizer and blocks said stabilizer in a rotationally-fixed manner relative to the vehicle body, wherein a level of the vehicle body with respect to said wheels can be lifted by actuation of said adjusting devices in a same direction and by blocking said stabilizer with respect to the vehicle body.

2. The chassis according to claim 1, wherein said adjusting devices are selected from the group consisting of hydraulically operating adjusting devices and electromechanically operating adjusting devices.

3. The chassis according to claim 1, wherein said coupling device is disposed at a center of said stabilizer.

4. The chassis according to claim 1, wherein said coupling device has a switchable blocking device for torque support of said stabilizer on the vehicle body.

5. The chassis according to claim 4, wherein said stabilizer can be blocked by a form closure.

6. The chassis according to claim 5, wherein said stabilizer has form-fitting elements in an area of said coupling device.

7. The chassis according to claim 4, wherein said stabilizer can be blocked by a friction closure.

8. The chassis according to claim 7, wherein said coupling device has rotatably mounted clamping pieces.

9. The chassis according to claim 8, wherein said clamping pieces are provided at least partially with a rubber coating for blocking said stabilizer.

10. The chassis according to claim 8, wherein said coupling device has a worm drive and said clamping pieces are rotatable via said worm drive.

11. The chassis according to claim 8, wherein said stabilizer has a diameter widened in an area of said clamping pieces.

12. The chassis according to claim 4, further comprising an electric motor for at least one of blocking or releasing the blocking of said stabilizer.

13. The chassis according to claim 1,
   wherein said coupling device has a lever connected to said stabilizer; and
   further comprising at least one actuator connecting said lever to the vehicle body.

14. The chassis according to claim 1, further comprising a control device for controlling said adjusting devices and for controlling said coupling device.

15. The chassis according to claim 1, wherein said coupling device has at least one spring mechanism for torque support of said stabilizer on the vehicle body.

16. The chassis according to claim 15, wherein said spring mechanism is a torsion bar disposed generally parallel to said stabilizer.

17. The chassis according to claim 16, wherein said torsion bar is connected in a rotationally fixed manner to a center of said stabilizer.

18. The chassis according to claim 17, further comprising entraining elements, said torsion bar has ends coupled to said entraining elements in a stationary mount on the vehicle.

19. The chassis according to claim 15, wherein said spring mechanism is a plate spring.

20. The chassis according to claim 19, wherein said plate spring is disposed centrally on said stabilizer.

* * * * *